US012590634B2

(12) United States Patent
Winder et al.

(10) Patent No.: US 12,590,634 B2
(45) Date of Patent: Mar. 31, 2026

(54) PISTON SEAL RING BYPASS

(71) Applicant: RTX Corporation, Farmington, CT (US)

(72) Inventors: Calvin Jay Winder, Cromwell, CT (US); Fadi S. Maalouf, East Hampton, CT (US); Matthew E. Bintz, West Hartford, CT (US); Ryan Hamilton Quinn, Berlin, CT (US); Justin Roger Delarm, Storrs Mansfield, CT (US); Shane Tyler West, Southington, CT (US); John P. Virtue, Jr., Middletown, CT (US); David R. Lyders, Glastonbury, CT (US); Anna Lauren Wright, Poulsbo, WA (US); Kalpendu J. Parekh, Brookline, MA (US); Pieter Van Lieu, Cheshire, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/426,952

(22) Filed: Jan. 30, 2024

(65) Prior Publication Data

US 2024/0255055 A1      Aug. 1, 2024

Related U.S. Application Data

(60) Provisional application No. 63/442,412, filed on Jan. 31, 2023.

(51) Int. Cl.
*F16J 9/16* (2006.01)
*F16J 15/16* (2006.01)
*F16J 15/34* (2006.01)
*F16J 15/44* (2006.01)

(52) U.S. Cl.
CPC ............... *F16J 9/16* (2013.01); *F16J 15/164* (2013.01); *F16J 15/3488* (2013.01); *F16J 15/443* (2013.01)

(58) Field of Classification Search
CPC .......... F16J 9/16; F16J 15/164; F16J 15/3488; F16J 15/443
See application file for complete search history.

(56) References Cited

U.S. PATENT DOCUMENTS 2,520,306 A * 8/1950 Detweiler .............. F16J 15/166
277/584
3,214,182 A * 10/1965 Herbruggen ............. F16J 15/32
277/465

(Continued)

FOREIGN PATENT DOCUMENTS

CN          113464210 A       10/2021
FR            2602847 A1        2/1988

*Primary Examiner* — Vishal A Patel
(74) *Attorney, Agent, or Firm* — Bachman & LaPointe, P.C.

(57) ABSTRACT

A machine comprising a rotor having: an inner member; an outer member encircling the inner member; and a groove in one of the inner member and the outer member. The groove has a first side wall, a second side wall and a base. A split ring seal is accommodated in the groove and contacts a surface of the other of the inner member and the outer member The first side wall has a plurality of open radial first channels and the second side wall has a plurality of open radial second channels.

11 Claims, 14 Drawing Sheets

(56) References Cited

U.S. PATENT DOCUMENTS

| | | | | |
|---|---|---|---|---|
| 3,727,925 A * | 4/1973 | Jones | ....................... | F16J 15/32 |
| | | | | 92/185 |
| 3,743,303 A | 7/1973 | Pope | | |
| 4,155,557 A * | 5/1979 | Grebert | .................... | F16J 15/32 |
| | | | | 92/182 |
| 4,577,870 A * | 3/1986 | Scott | ........................ | F16J 15/32 |
| | | | | 277/587 |
| 4,674,754 A * | 6/1987 | Lair | ....................... | F16J 15/166 |
| | | | | 277/471 |
| 4,972,986 A | 11/1990 | Lipschitz | | |
| 5,106,208 A | 4/1992 | Bobo et al. | | |
| 5,171,027 A * | 12/1992 | Domkowski | .......... | F16H 57/08 |
| | | | | 277/400 |
| 8,186,939 B2 | 5/2012 | Lecuyer et al. | | |
| 8,408,555 B2 | 4/2013 | Garrison | | |
| 8,888,104 B2 | 11/2014 | Garrison | | |
| 8,939,710 B2 | 1/2015 | Webb | | |

| | | | | |
|---|---|---|---|---|
| 8,992,168 B2 | 3/2015 | Norris et al. | | |
| 9,410,428 B2 | 8/2016 | Lucas et al. | | |
| 9,903,214 B2 | 2/2018 | Kenyon et al. | | |
| 10,082,034 B2 | 9/2018 | Merry et al. | | |
| 10,161,251 B2 | 12/2018 | Bintz et al. | | |
| 10,197,168 B1 * | 2/2019 | Whitlow | .............. | F16K 5/0689 |
| 10,359,135 B2 * | 7/2019 | Cardi | ..................... | F16L 55/07 |
| 10,458,242 B2 | 10/2019 | Abrari | | |
| 10,458,264 B2 * | 10/2019 | Mongillo, Jr. | ........ | F01D 11/006 |
| 10,472,969 B2 | 11/2019 | Fujimura | | |
| 10,718,218 B2 | 7/2020 | Dierksmeier | | |
| 10,781,709 B2 | 9/2020 | Sen et al. | | |
| 10,794,190 B1 | 10/2020 | Memmen et al. | | |
| 10,801,338 B1 | 10/2020 | Memmen | | |
| 10,934,865 B2 | 3/2021 | Kush | | |
| 11,221,140 B2 | 1/2022 | Shi et al. | | |
| 11,542,819 B2 | 1/2023 | Heyerman | | |
| 12,234,733 B1 * | 2/2025 | Van Lieu | .............. | F01D 11/005 |
| 2022/0082022 A1 | 3/2022 | Kray et al. | | |
| 2022/0136447 A1 | 5/2022 | Garrison | | |

* cited by examiner

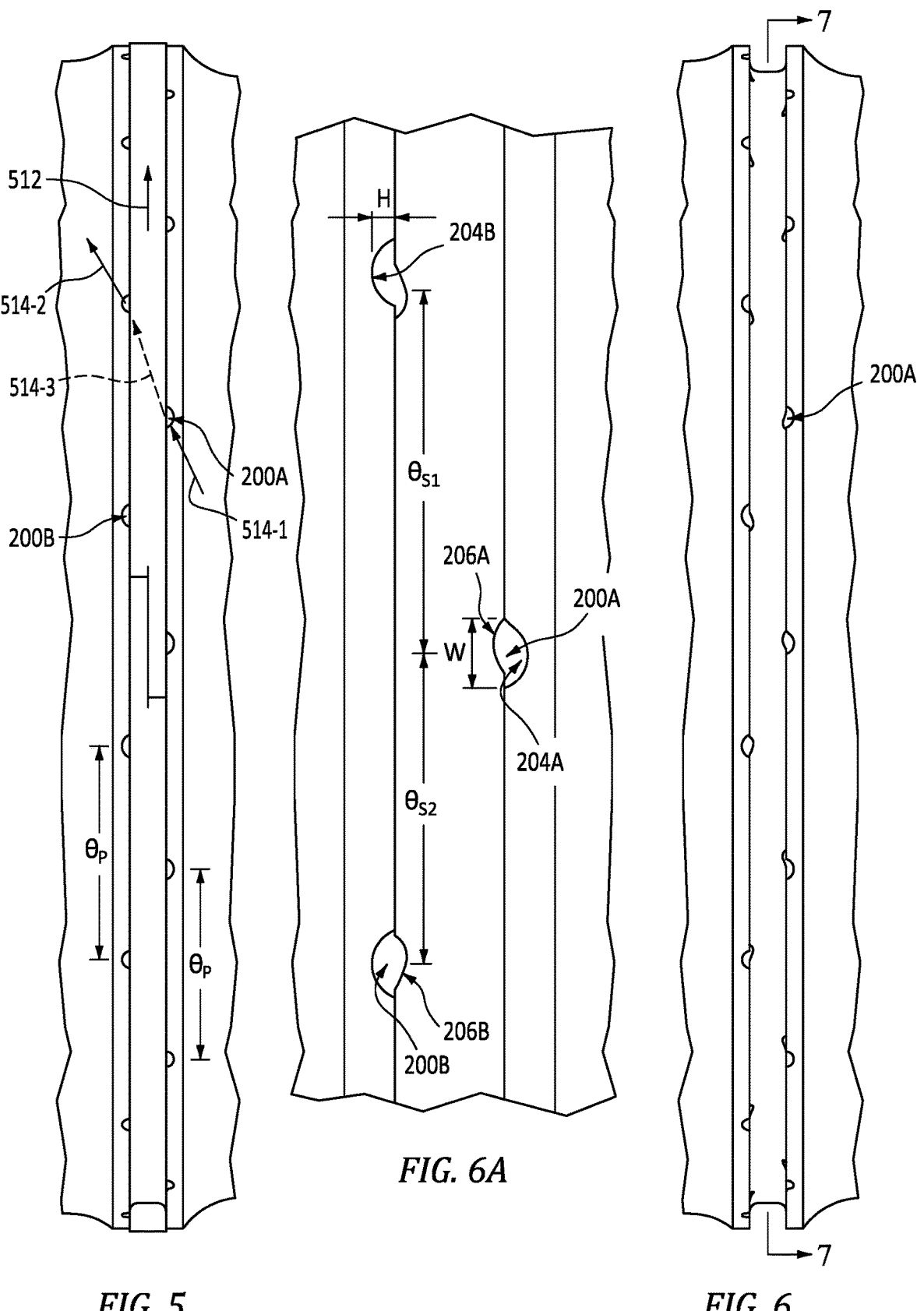
*FIG. 5*                    *FIG. 6A*                    *FIG. 6*

PISTON SEAL RING BYPASS

CROSS-REFERENCE TO RELATED APPLICATION

Benefit is claimed of U.S. Patent Application No. 63/442,412, filed Jan. 31, 2023, and entitled "Piston Seal Ring Bypass", the disclosure of which is incorporated by reference herein in its entirety as if set forth at length.

BACKGROUND

The disclosure relates to gas turbine engines. More particularly, the disclosure relates to piston seal rings (PSR).

Gas turbine engines (used in propulsion and power applications and broadly inclusive of turbojets, turboprops, turbofans, turboshafts, industrial gas turbines, and the like) use PSR in several situations.

A PSR seals between an inner member and an outer member. The inner member and outer member may be static structure such as case components. Or, the inner member and the outer member may be rotating structure such as components of a spool or rotor. The inner member and the outer member may be subject to small excursions relative to each other. For example, torque loads may cause small rotational movements; thrust loads or differential thermal expansion may cause small axial movements. Vibration may also cause small rotational or axial movements. Such small or transient rotational movements, however, are distinguished from continuous relative rotational movement such as in face seal or shaft seal between two relatively rotating components (e.g., two different spools or a spool and a static structure).

The PSR is accommodated in an outer diameter groove in the inner member. Under dynamic and/or pressure loading, the PSR seals against a sidewall of the groove and an inner diameter surface of the outer member. In one example of such a situation involving a rotor, the inner member is a shaft and the outer member is a rotor stack of the associated spool. In a more particular example, the outer member is a seal runner protruding axially from a protuberant bore of a disk of the rotor stack. In some embodiments of such a rotor, tension in the shaft holds the rotor stack in precompression.

Small rotational, axial, and/or radial displacements of the shaft and seal runner may be caused by factors including transients and changes in operational conditions such as torque and thrust loads (which will vary between one steady state condition and another steady state condition). In such an example, the PSR is accommodated in an outer diameter (OD) groove in the shaft. In an operational condition where there is a pressure difference across the PSR, optimally, one axial end face of the PSR will bear against and seal against the adjacent sidewall face of the groove and the outer diameter (OD) surface of the PSR will bear and seal against the inner diameter (ID) surface of the seal runner. Considering only pressure loading, if a first axial end face of the PSR is subject to higher pressure than the opposite second axial end face, the pressure difference will shift the PSR so that the second axial end face seats and seals against the associated/adjacent sidewall face of the groove. However, the pressure component is likely to be overcome by a dynamic component (e.g., runner coning under load) causing seating at one side or the other. Also, as discussed below, the optimal situation of an even seating at one side is not always the case.

PSRs are often small in cross section so as to be relatively compliant compared to the contacting structure (e.g., members forming the groove and runner). The ring is split for assembly purposes and/or to allow radial expansion under centrifugal loading. The ring circumferential ends may form an overlapping joint (e.g., a shiplap joint). The small cross section and split provide the ring with little hoop strength and twist resistance. For example, with a nickel alloy shaft and nickel alloy runner, ring material may be nickel or cobalt alloy and may have generally similar material hardness (at least of a substrate if coated). Example coatings are an aluminum bronze (CuAl) layer directly atop the substrate outer diameter surface and a molybdenum sulfide ($MoS_2$) layer thereatop and extending onto the substrate axial end surfaces.

The manufacturing process as well as operational loads and wear can cause the ring's sealing surfaces to have flatness (of axial end faces) and/or circularity (of OD surface) errors that allow for local leakage through the seal. Non-axisymmetric leakage (e.g., of hot air) from the end gap (joint) or due to such PSR form errors leads to local thermal hotspots on the contacting structure (or coldspots such as if there as a low temperature pressurized fluid). These thermal hotspots may in turn, lead to non-axisymmetric distortion of the contacting structure resulting in mass unbalance, localized stress concentrations, and reduced sealing performance. Other factors such dimensional non-uniformities or imbalances may also contribute to a non-axisymmetric unseating, exacerbating the situation.

To combat flatness errors of the ring, some PSR designs have incorporated a secondary (spacer) ring that under centrifugal load provides a wedging action to seat a primary (seal) ring against the groove sidewall. See, U.S. Pat. No. 8,939,710, of Webb, Jan. 27, 2015, and entitled "Rotating turbomachine seal", the disclosure of which is incorporated by reference in its entirety herein as if set forth at length. That patent discloses slots in the face of the secondary ring to vent high pressure gas into the groove. The wedging may also correct some departures from circularity. This type of configuration requires additional parts, introduces additional wear surfaces, can be difficult to design with tolerances and varying PSR loads, and is only applicable to rotating applications.

SUMMARY

One aspect of the disclosure involves a machine comprising a rotor having: an inner member; an outer member encircling the inner member; and a groove in one of the inner member and the outer member. The groove has a first side wall, a second side wall and a base. A split ring seal is accommodated in the groove and contacts a surface of the other of the inner member and the outer member. The first side wall has a plurality of open radial first channels and the second side wall has a plurality of open radial second channels.

In a further embodiment of any of the foregoing embodiments, additionally and/or alternatively, in an outward radial direction the second channels have an angular component opposite an angular component of the first channels.

In a further embodiment of any of the foregoing embodiments, additionally and/or alternatively, viewed axially, the first channels and second channels are off radial by an angle $\theta$ of at least 5°.

In a further embodiment of any of the foregoing embodiments, additionally and/or alternatively, the machine is a turbomachine having an upstream end and a downstream end. The first channels are upstream channels. The second channels are downstream channels. The rotor has a direction of rotation. In the outward radial direction the second channels have said angular component in the direction of rotation.

In a further embodiment of any of the foregoing embodiments, additionally and/or alternatively, the first channels and the second channels are open channels.

In a further embodiment of any of the foregoing embodiments, additionally and/or alternatively, the first channels and the second channels are closed channels each having a first port in the groove and a second port outside the groove.

In a further embodiment of any of the foregoing embodiments, additionally and/or alternatively, the first channels and the second channels are arcuate.

In a further embodiment of any of the foregoing embodiments, additionally and/or alternatively, the first channels and the second channels are at least 30% out of phase with each other.

In a further embodiment of any of the foregoing embodiments, additionally and/or alternatively, the first channels are identical to the second channels In a further embodiment of any of the foregoing embodiments, additionally and/or alternatively: there are three to forty first channels, more narrowly, four to thirty-two or eight to twenty-four or ten to twenty or twelve to eighteen (e.g., an example sixteen); and there are three to forty second channels, more narrowly, four to thirty-two or eight to twenty-four or ten to twenty or twelve to eighteen (e.g., an example sixteen).

In a further embodiment of any of the foregoing embodiments, additionally and/or alternatively, the groove is in the inner member.

In a further embodiment of any of the foregoing embodiments, additionally and/or alternatively, the machine is a gas turbine engine wherein: the inner member is a shaft of a spool; and the outer member is a seal runner protruding from a bore of a disk of a rotor stack of the spool.

In a further embodiment of any of the foregoing embodiments, additionally and/or alternatively: the inner member is made of a nickel-based alloy; the outer member is made of a nickel-based alloy; and the split ring seal comprises or consists of a nickel-based alloy or a cobalt-based alloy.

In a further embodiment of any of the foregoing embodiments, additionally and/or alternatively, a method for using the machine comprises: driving rotation of the inner member and the outer member (as a unit) and creating a pressure difference across the split ring seal; and the pressure difference causing gas flow through the first channels into the groove and from the groove through the second channels.

In a further embodiment of any of the foregoing embodiments, additionally and/or alternatively, the gas flow reduces a circumferential thermal asymmetry induced by a circumferentially asymmetrical seating of at least one of the first axial end face and the second axial end face.

Another aspect of the disclosure involves an apparatus comprising: an inner member; an outer member encircling the inner member; and a split ring seal accommodated in a groove in one of the inner member and the outer member and contacting a surface of the other of the inner member and the outer member. The groove has a first side wall and a second face side wall. The apparatus has circumferentially distributed venting means for bypassing the seal along the first side wall and the second side wall.

In a further embodiment of any of the foregoing embodiments, additionally and/or alternatively, the split ring seal comprises: a first circumferential end and a second circumferential end; an inner diameter surface and an outer diameter surface; and a first axial end face and a second axial end face. The first circumferential end and the second circumferential end form a joint.

Another aspect of the disclosure involves a machine comprising a rotor having: an inner member; an outer member encircling the inner member; and a groove in one of the inner member and the outer member. The groove has a first side wall, a second side wall and a base. A split ring seal is accommodated in the groove and contacts a surface of the other of the inner member and the outer member. Said one of the inner member and outer member comprises means for preserving circumferential flow.

In a further embodiment of any of the foregoing embodiments, additionally and/or alternatively, the means comprises off-radial passages on opposite sides of the groove, oppositely oriented.

In a further embodiment of any of the foregoing embodiments, additionally and/or alternatively, the means comprises equal numbers of evenly-spaced off-radial passages on opposite sides of the groove, oppositely oriented and out of phase.

In a further embodiment of any of the foregoing embodiments, additionally and/or alternatively, the inner member is a shaft and the outer member is a rotor disk.

In a further embodiment of any of the foregoing embodiments, additionally and/or alternatively, the groove is in the inner member.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 5 is an inward radial view of the PSR seated in the groove.

FIG. 6 is an inward radial view of the groove.

FIG. 6A is an enlarged view of the groove of FIG. 6.

Like reference numbers and designations in the various drawings indicate like elements.

DETAILED DESCRIPTION

To reduce the severity of the thermal asymmetry associated with a non-axisymmetric leakage (e.g., due to a joint, PSR form/shape irregularities, or a locally mis-seated seal ring (PSR)), venting features providing a base leakage or bypass may be added around the circumference of the groove that accommodates the PSR. The term "base" is used to limit confusion with "baseline" (used to identify a prior art PSR or other PSR lacking the features). The leakage is sufficient to at least partially offset any non-axisymmetric leakage and thus reduces the severity of the thermal asymmetry.

The example venting features are passages shown as radial channels machined on or in both axial end walls of the member containing the groove. These channels allow leakage through the channels on the high pressure, side around the PSR, and through the channels on the low pressure side. Based on the system requirements the channels' size, shape, and location can be adjusted to maintain an adequate seal.

For example, if a given condition introduces a non-axisymmetric leakage, superimposing a more axisymmetric leakage due to the channels, reduces the relative thermal asymmetry even if there is a further increase in heating at the hot spot. A similar consideration may occur if the high pressure area is relatively cool and leakage causes local cooling (cold spot).

Figure 1:
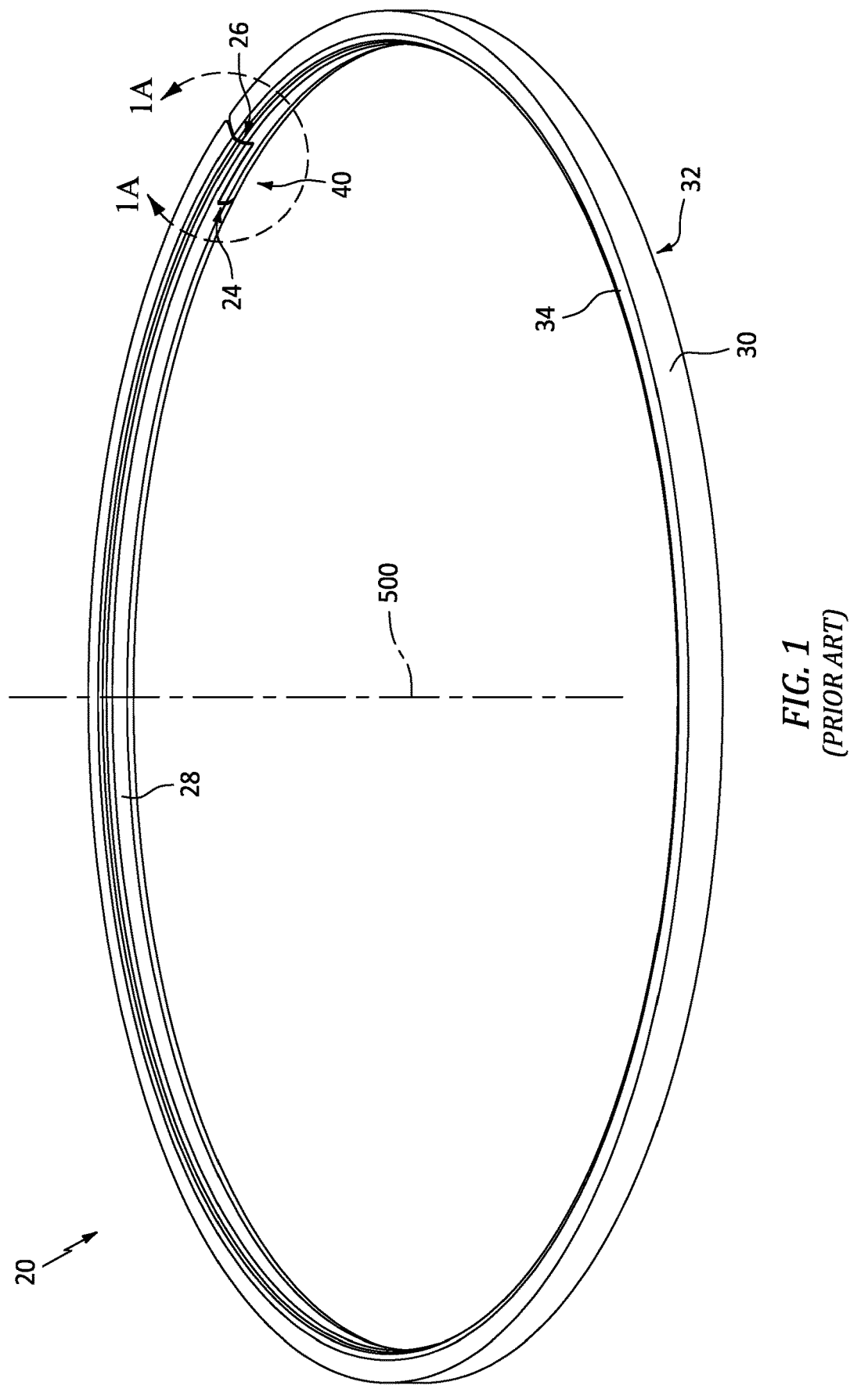
FIG. 1 is a view of a piston seal ring (PSR).
Figure 1A:
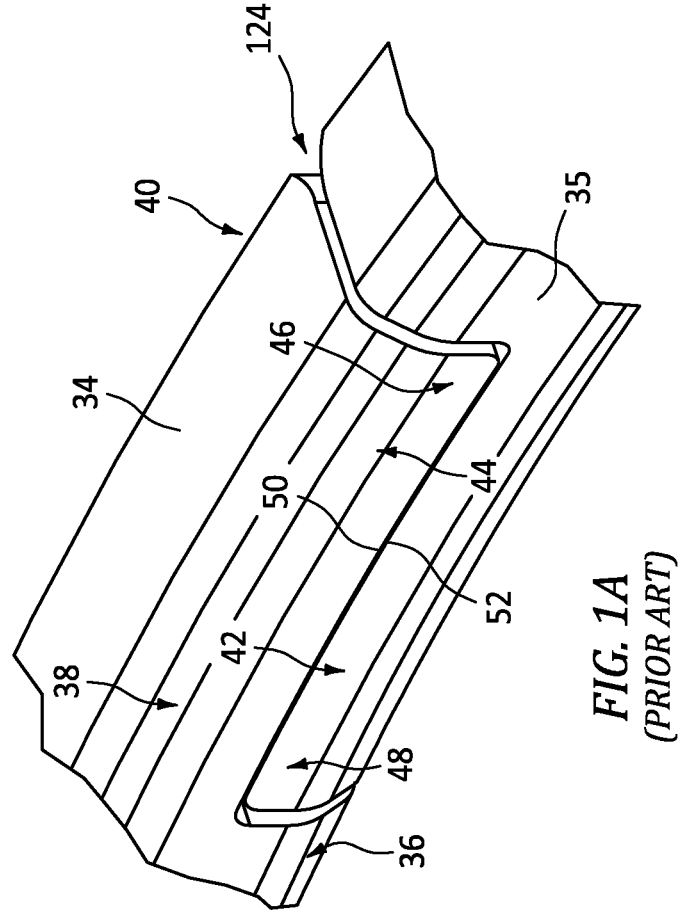
FIG. 1A is an enlarged view of a joint of the PSR.

FIG. 1 shows a piston seal ring (PSR) formed as a split ring seal 20 having a first circumferential end 24, a second circumferential end 26, an inner diameter (ID) surface 28, an outer diameter (OD) surface 30, a first axial end face 32, and a second axial end face 34. The PSR has a nominal central longitudinal axis (centerline) 500 shared with the members it seals when in a nominally centered condition. FIG. 1A shows the ID surface 28 as having a straight (circular cylindrical) central portion 35 and more frustoconical transitions 36 and 38 to the axial end faces 32 and 34, respectively. In the example, there are more radiused transitions at the extremes of the transitions 36 and 38 than centrally within those transitions. Viewed in section, junctions between the axial end faces and ID and OD surfaces are shown as radiused corners. However, other junctions are possible.

In the example, first circumferential end 24 and second circumferential end 26 form a joint or junction 40 (FIG. 1A). The example joint 40 is a shiplap joint with a projecting portion 42 of the first circumferential end received in a rebate 48 of the second circumferential end and a projecting portion 44 of the second circumferential end received in a rebate 46 in the first circumferential end. The example projecting portions have mating faces/surfaces 50, 52 which, in the example, closely face or contact along a transverse radial centerplane 502 (FIG. 2) of the PSR.

The PSR may consist of a single alloy piece or may comprise a single alloy piece substrate with one or more coating layers along portions of its exterior surface (and thus forming associated portions of the exterior surface of the PSR). Alternative PSR materials include composites (e.g., non-metallic carbon-based composites).

Figure 2:
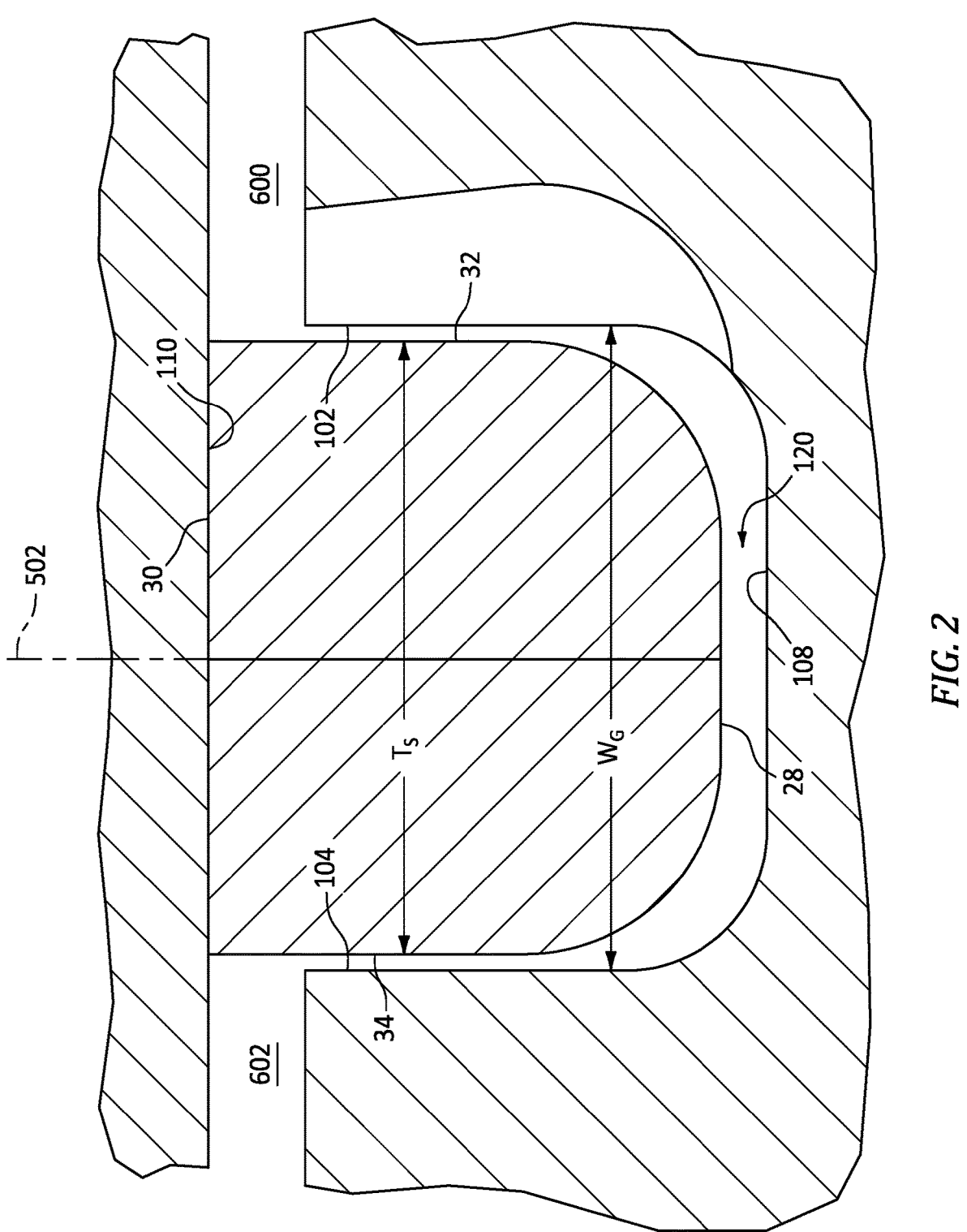
FIG. 2 is a longitudinal sectional view of the PSR seated in a shaft groove and engaging a seal runner.
Figure 8:
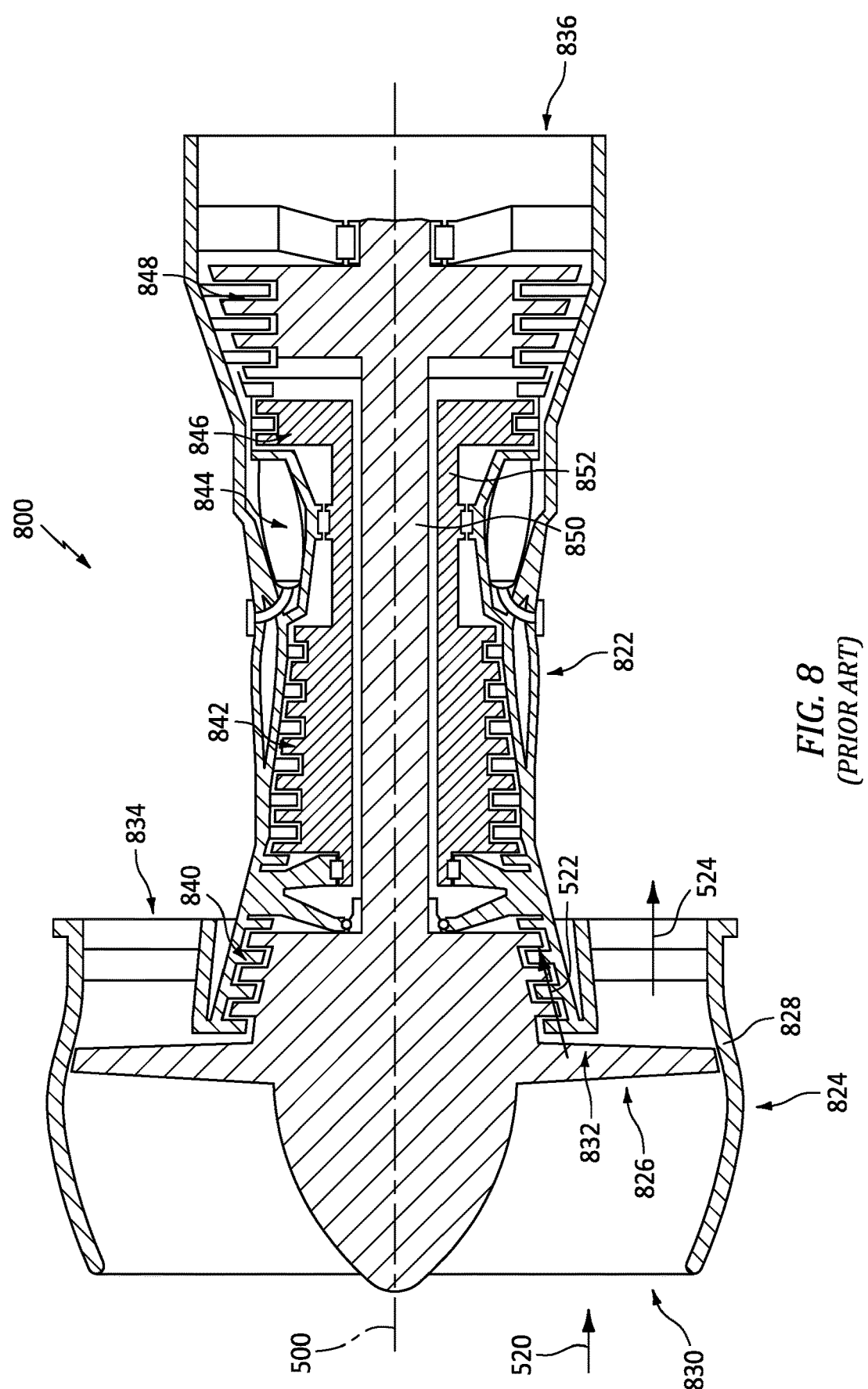
FIG. 8 is a schematized half sectional view of a gas turbine engine.
Figure 8A:
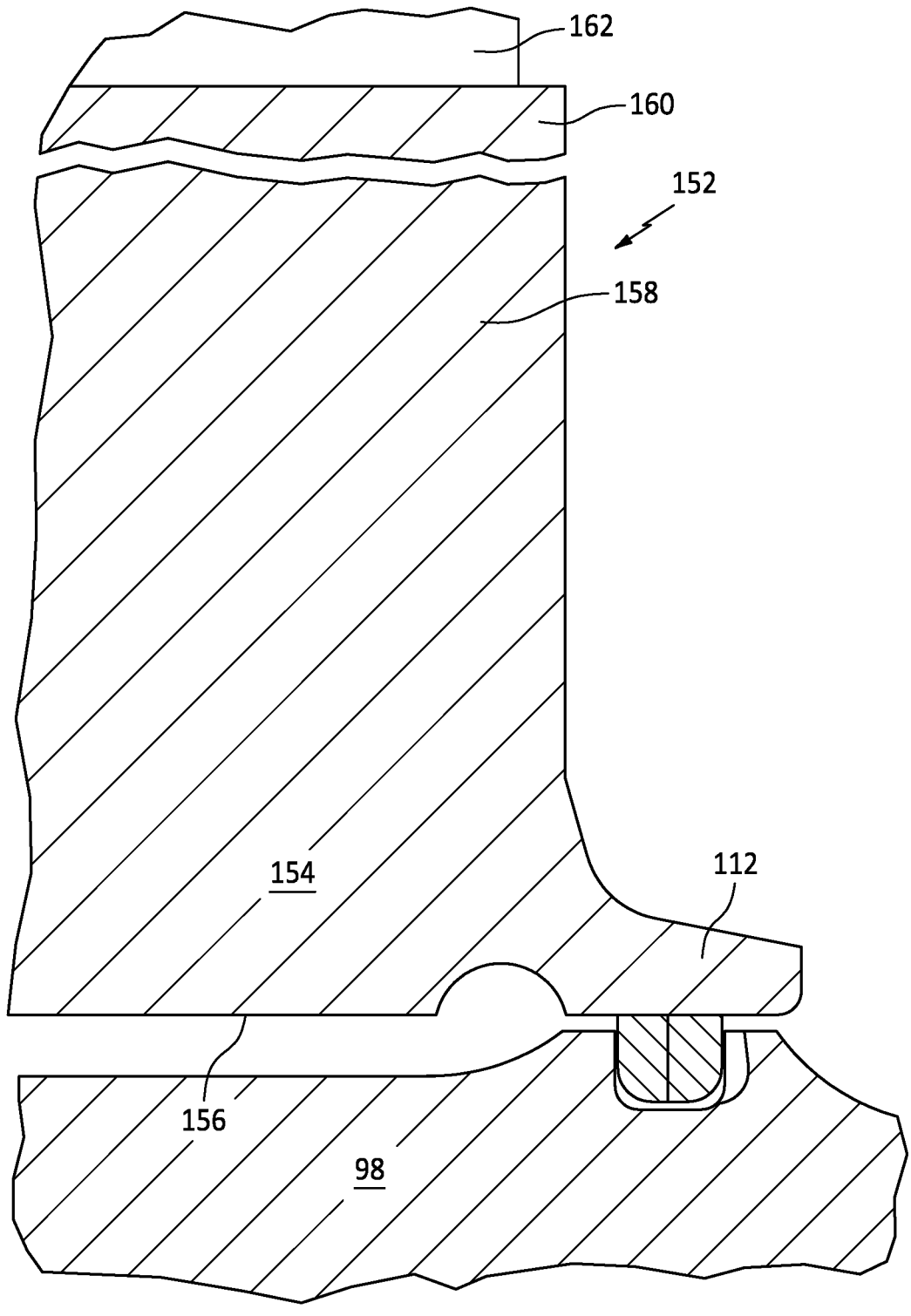
FIG. 8A is a partial longitudinal sectional view of a gas turbine engine rotor showing the PSR.
Figure 8B:
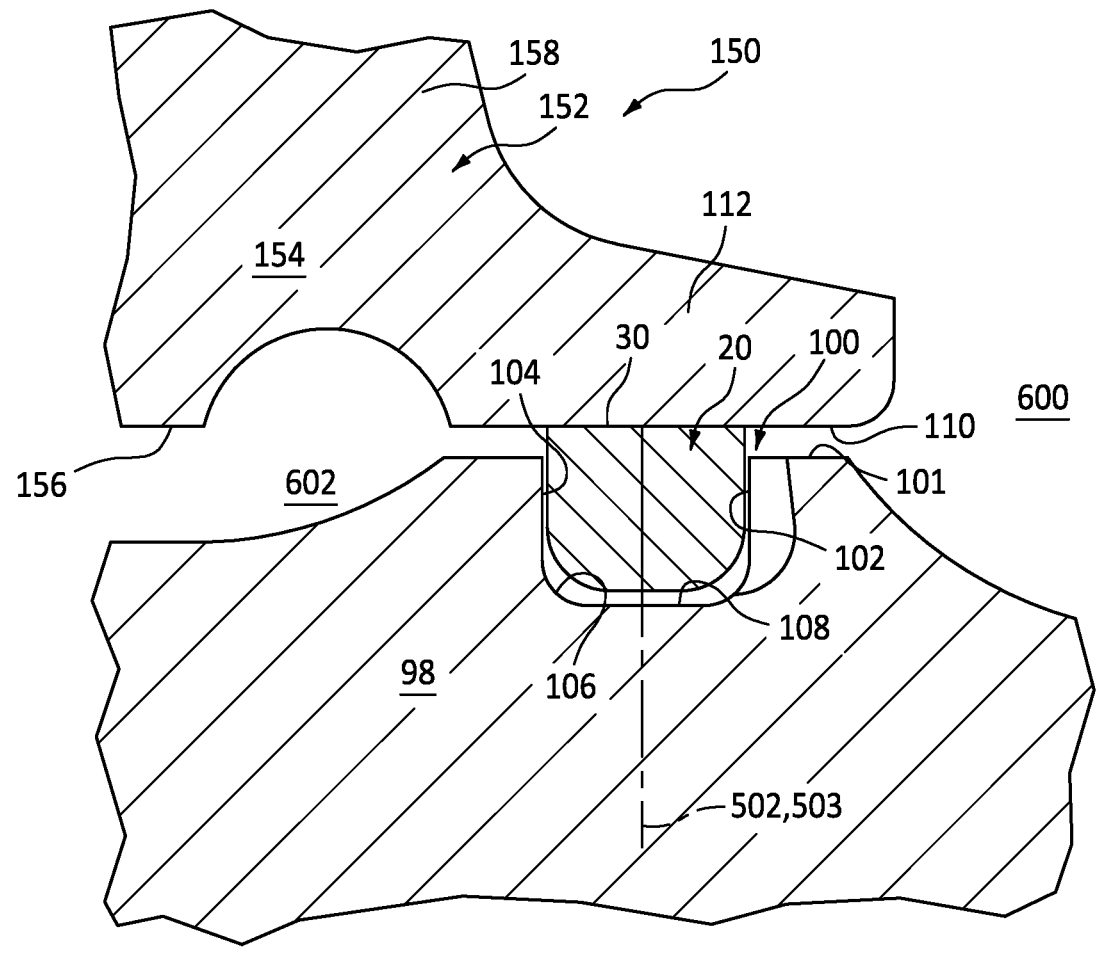
FIG. 8B is an enlarged view of the seated PSR of FIG. 8A.
Figure 9:
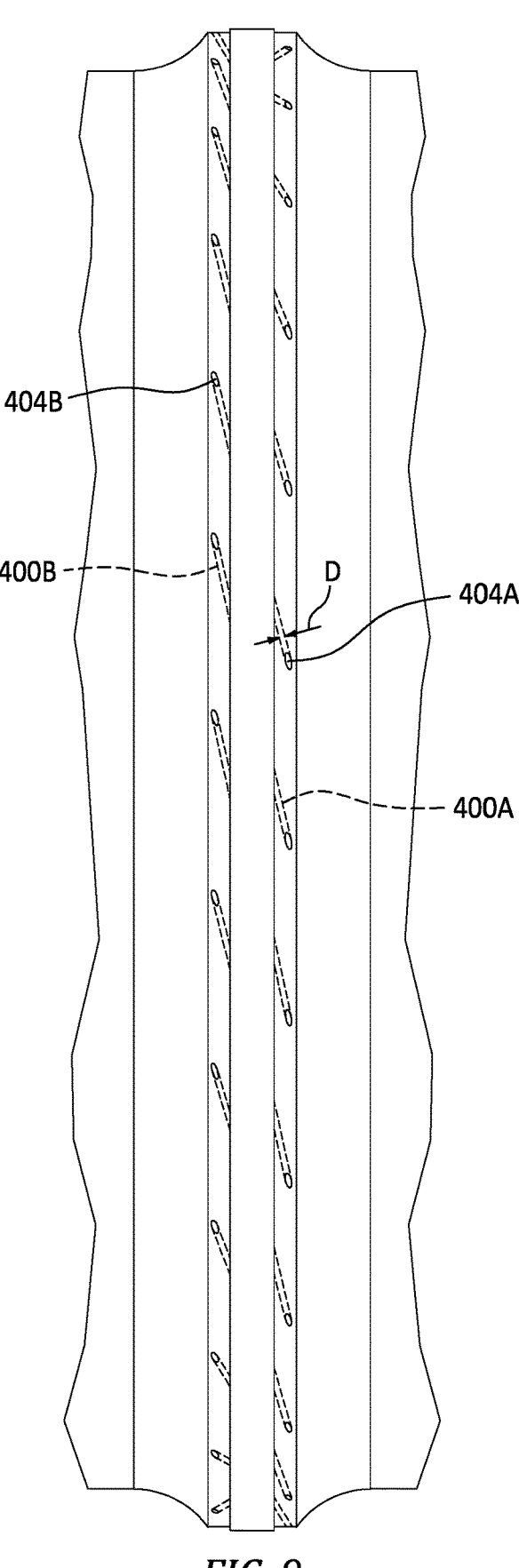
FIG. 9 is an inward radial view of the PSR seated in a groove in a second shaft.
Figure 10:
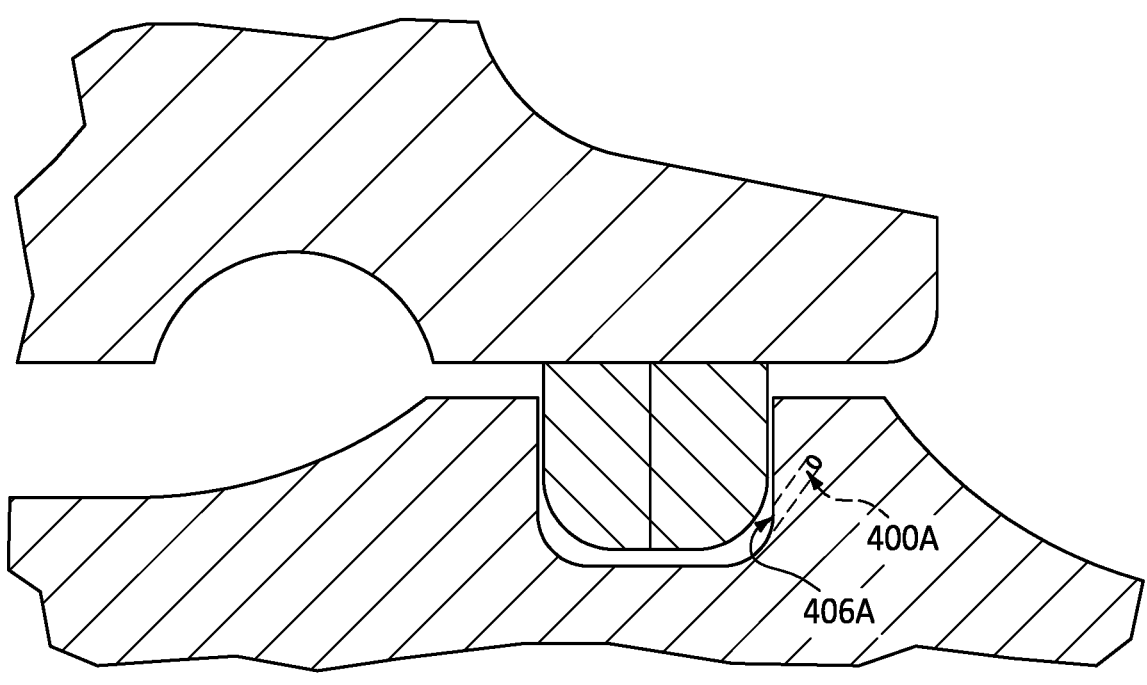
FIG. 10 is a longitudinal sectional view of the PSR seated in a shaft groove and engaging a seal runner.
Figure 11:
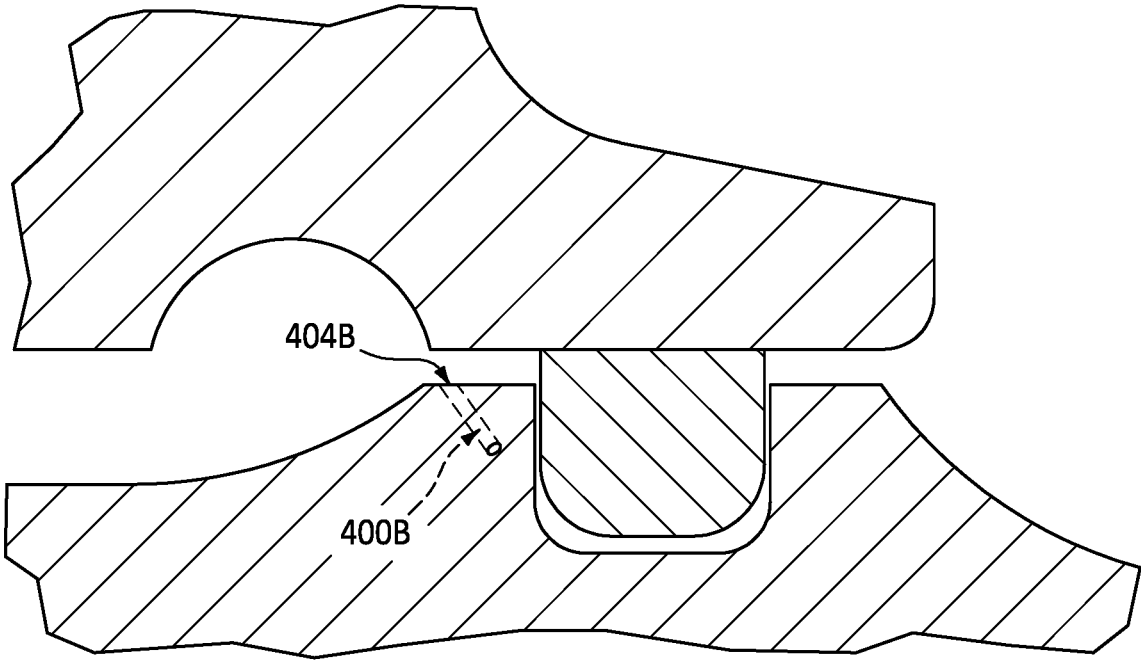
FIG. 11 is a longitudinal sectional view of the PSR clocked relative to the view of FIG. 10.
Figure 12:
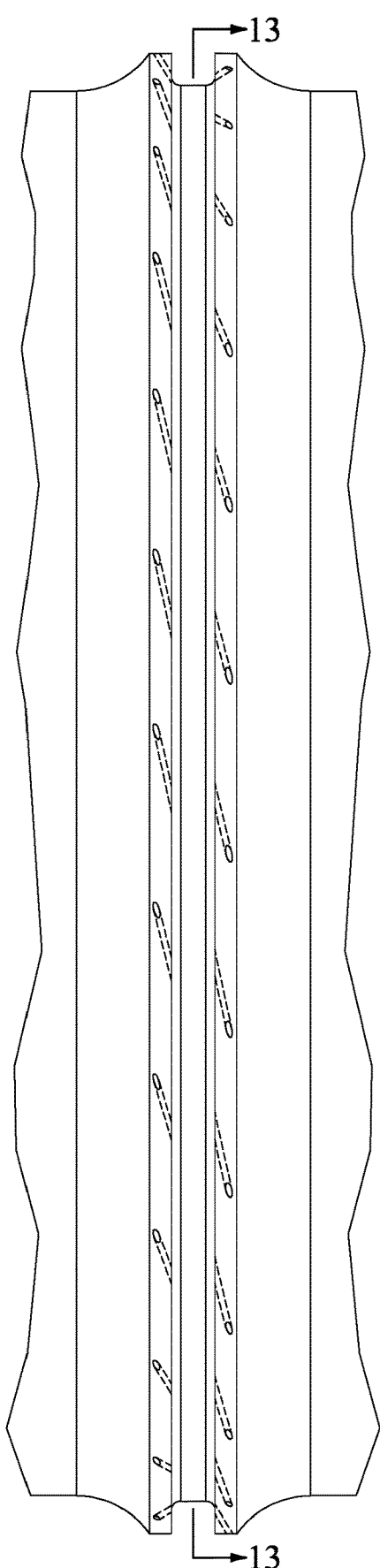
FIG. 12 is an inward radial view of the groove of the second shaft.
Figure 13:
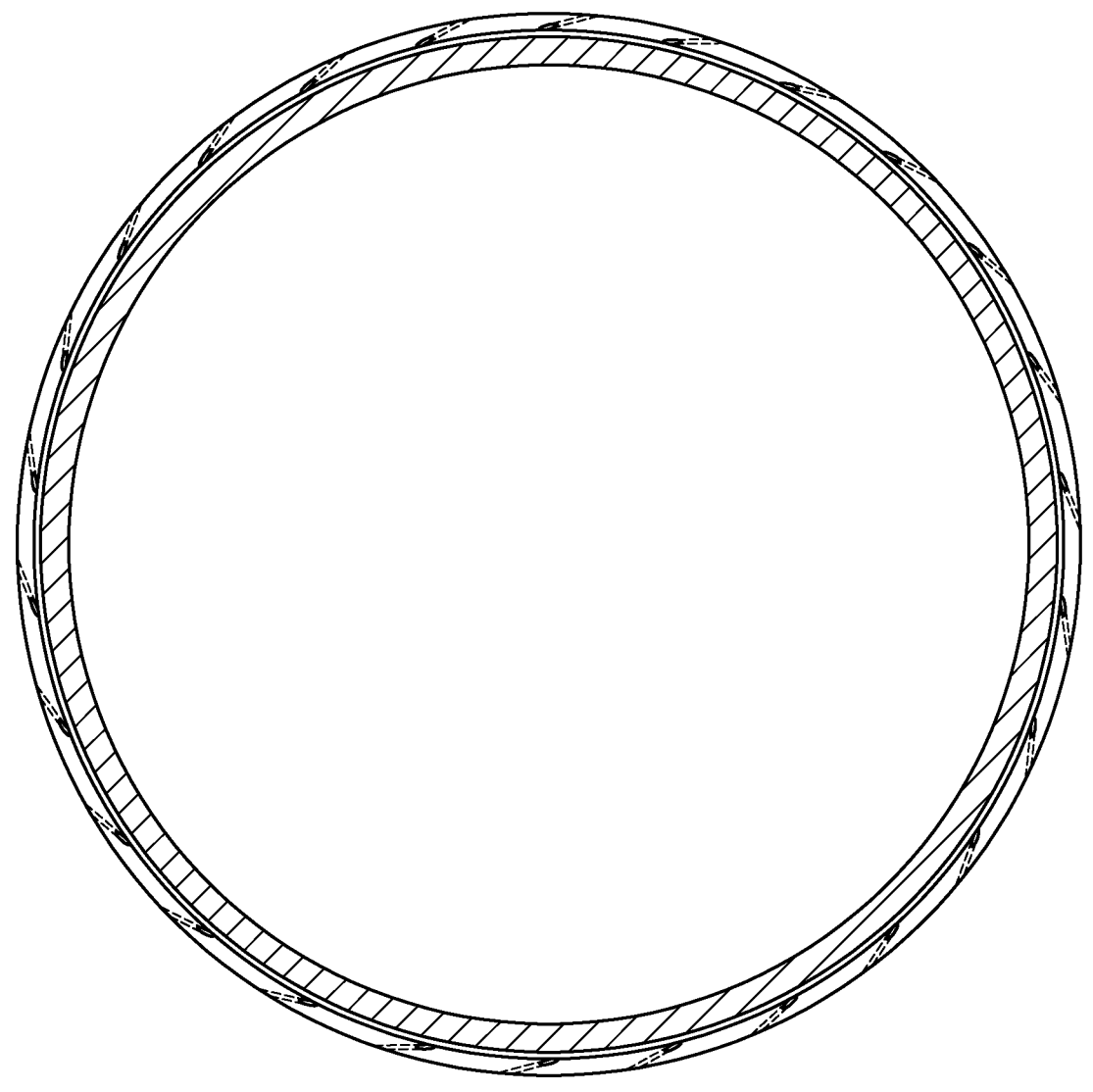
FIG. 13 is a transverse sectional view of the second shaft through the groove.

FIGS. 2, 8A, and 8B show the PSR 20 seated in an outer diameter groove 100 (FIG. 8B) in an inner member (e.g., shaft or shaft section) 98 and sealing against an ID surface 110 of an outer member 112 (e.g., a seal runner). The groove 100 has a first sidewall or end wall 102, a second sidewall or end wall 104, and a base 106 joining the two. The groove has a transverse centerplane 503 which may be coincident with the PSR centerplane 502 when the PSR is centered in the groove. In the example gas turbine engine, the first sidewall is an aft sidewall and the second sidewall is a forward sidewall. Example junctions between the sidewalls and the base are shown as quarter-rounds, chamfers, or bevels 108. However, right angle junctions or other transitions are possible. The groove 100 extends radially inward from an outer diameter (OD) surface section or portion 101 of the inner member.

FIG. 8A shows the PSR in a gas turbine engine rotor 150 including the shaft section 98. Such a situation is discussed as background above. The example rotor is the high pressure compressor (HPC) portion of a high pressure spool of a two-spool engine. The rotor includes a stack of blade disks 152. Each blade disk includes a protuberant inner diameter (ID) bore 154 having an ID surface 156. A radial web 158 extends outward from the bore to a rim structure 160. A circumferential array of blades 162 (shown with airfoil tips cut away) may be mounted to the rim (e.g., via fir tree or dovetail mounting). Or, blade airfoils may be unitarily formed with the rim and the rest of the disk (e.g., an integrally bladed rotor (IBR)).

The example PSR seals between the rotor shaft section 98 and one of the disk bores 154 as they rotate as a unit. The PSR accommodates small excursions between the two members it seals due to dynamic or static loading, thermal effects, and the like. The example seal runner 112 is unitarily formed with the particular disk bore and protrudes axially from the disk bore near the ID surface thereof to a free distal end/rim of the seal runner. This is one non-limiting example of one baseline situation.

In the example, there is axial play (i.e., the axial length $W_G$ (FIG. 2A) between the groove 102 and 104 sidewalls is greater than the axial length or thickness $T_S$ of the PSR between the axial end faces 32 and 34). This axial play allows the presence of an axial gap between the PSR axial end face(s) and the adjacent groove sidewall(s). It potentially allows cocking of the PSR cross-section to contact both sidewalls and, thus, have one radially diverging gap and one radially converging gap if the aligned clearance is small enough (groove width $W_G$ is only slightly greater than the PSR thickness $T_S$).

In the example, there also is radial play with an ID radial gap 120 between the ID surface 28 of the PSR and the base of the groove. In the example, this is a static gap and a dynamic gap discussed below.

The example PSR has a relaxed condition wherein the circumferential ends 24 and 26 are not completely nested/bottomed against each other (there is a slight circumferential gap 124 (FIG. 1A). When assembled over the shaft and seated in the groove, there may be a small ID gap 120. However, the PSR OD surface 30 may be close to flush and even potentially sub-flush to the adjacent shaft OD surface 101. Thus, when the seal runner is assembled over the shaft and PSR, there is an at least local OD radial gap between the PSR OD surface 30 and the seal runner ID surface 110. However, when the shaft rotates, centrifugal action will radially expand the PSR, closing the OD gap and expanding the ID gap 120 (or creating the ID gap) and expanding the circumferential gap 124. This centrifugal action biases the PSR OD surface 30 into sealing engagement with the ID surface 110 of the seal runner.

Nevertheless, other variations include the PSR having a relaxed diameter of the OD surface 30 greater than the diameter of the seal runner ID surface 110 so as to have a static radial sealing bias not merely a dynamic radial sealing bias.

In use, various static and dynamic factors may cause uneven seating.

Figure 3:
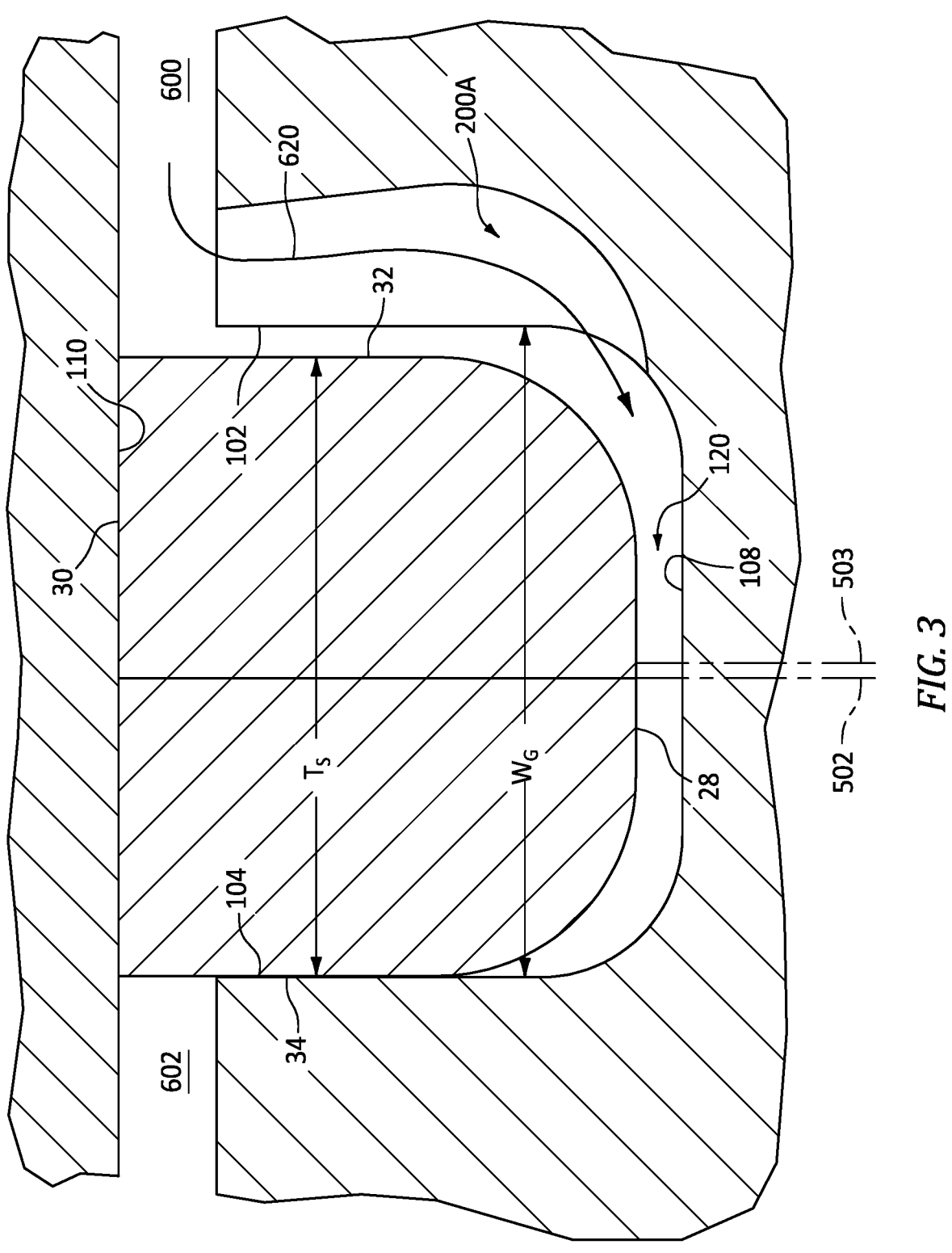
FIG. 3 a longitudinal sectional view of the seated PSR under pressure load.

FIG. 2 shows the sealing between a first region or volume 600 and a second region or volume 602. In an example dynamic operating condition, the first region is a high pressure region and the second region is a low pressure region so that the pressure difference biases the PSR so that the axial end face to the low pressure side of the PSR contacts the groove sidewall 104 (FIG. 3) to the low pressure side and there is an axial gap 130 between the high pressure side axial end face of the PSR and the high pressure side sidewall of the groove. However, due to the asymmetries noted above, this dislodgement from low pressure side engagement may be at a limited circumferential extent. Other factors may overcome the pressure bias and cause unseating at the low pressure side (creating an axial gap (not shown)) and even potential contact at the high pressure side (not shown).

Figure 4:
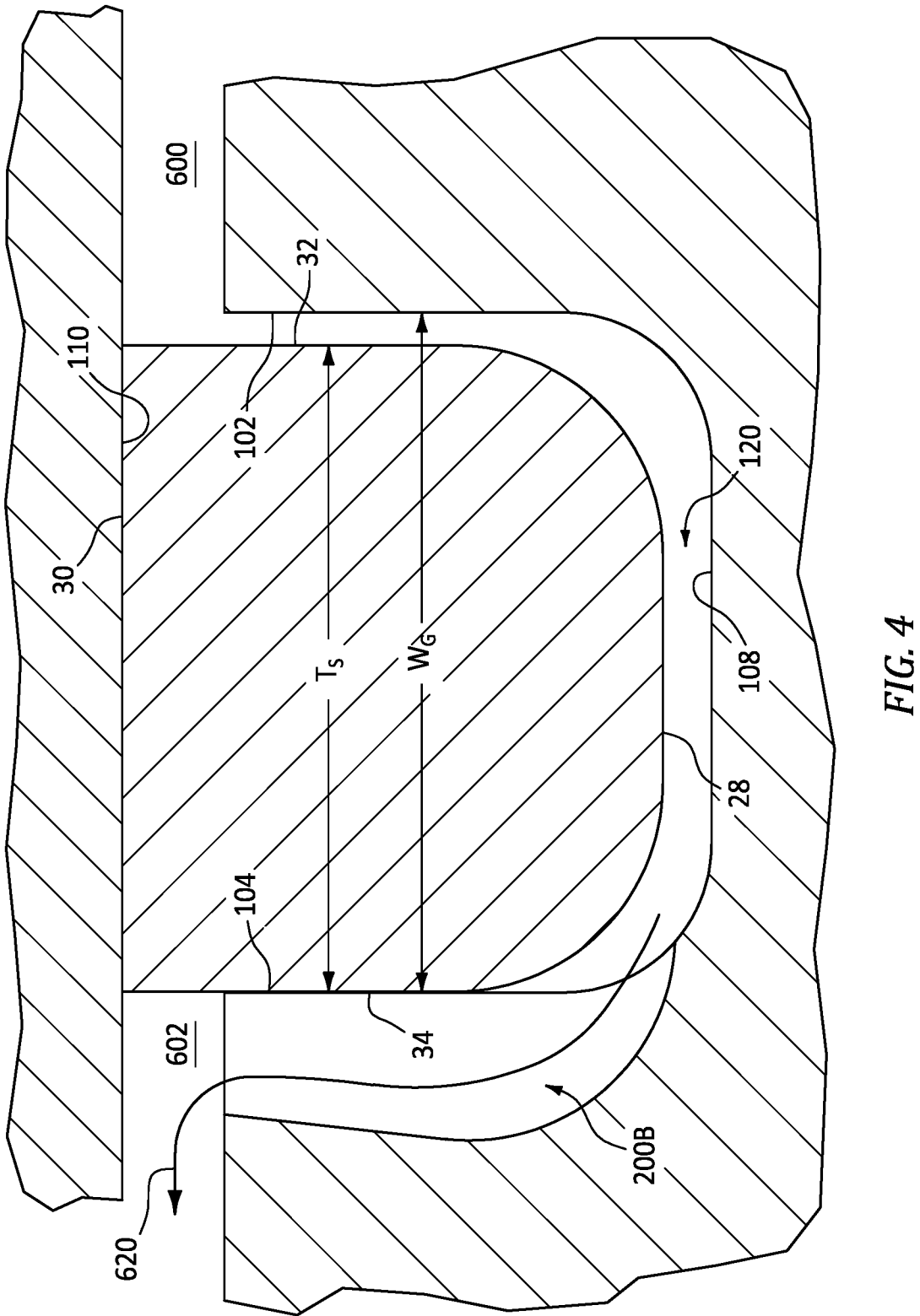
FIG. 4 is a longitudinal sectional view of the PSR clocked relative to the view of FIG. 3.
Figure 7:
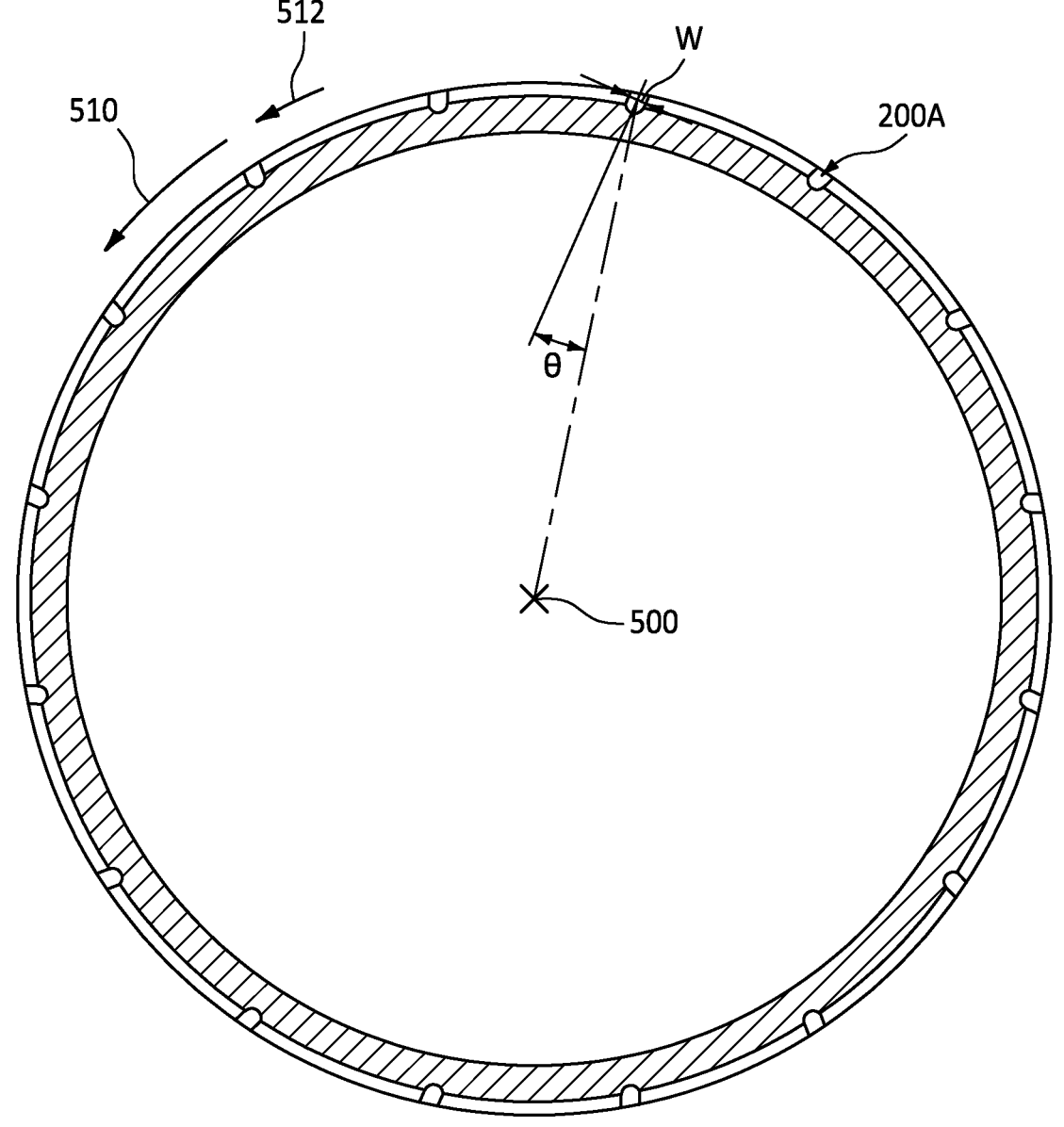
FIG. 7 is a transverse sectional view of the shaft through the groove.

To provide venting (discussed further below), the groove has first and second circumferentially distributed pluralities of vents 200A (FIG. 3), 200B (FIG. 4) respectively aft and fore. In the FIGS. 2-5 example, the vents are channels, more particularly, open channels (or grooves or slots) (e.g., vs. closed channels being through-holes) along the first sidewall 102 and similar open channels along the second sidewall 104 both extending from the OD surface 101 toward the base 106. Channel axial depth or height is labeled H (FIG. 6A) and channel width is labeled W (FIG. 7).

Example H is at least 0.25 mm or 0.25 mm to 1.25 mm, more particularly, 0.35 mm to 0.50 mm. Example W is at least 1.2 mm or 1.2 mm to 13 mm, more particularly, 1.7 mm to 2.2 mm. Example H is measured axially at the location of deepest axial penetration. Example W (FIG. 7) is measured transversely normal to the length of the channel at the outer diameter surface.

The illustrated channels extend essentially the full radial span of overlap between the centered PSR 20 and the groove 100. FIG. 7 shows the channels as being off-radial having an angular component with an angle $\theta$ relative to radial. Example angular component is measured viewed axially between the centers of the ends of the channels. In some embodiments, $\theta$ may be 0°. That offers ease of manufacture and limitation of structural compromise. Contemplating that, example $\theta$ is 0° to 75°, or 0° to 45°, or 0° to 35°. Example nonzero $\theta$ is at least 5°, more particularly 5° to 75°, or 10° to 45°, or 20° to 35°. FIG. 7 shows a direction of rotation 510 of the rotor. As air bleeds radially inward to become the leakage flow past the PSR, conservation of energy causes the air to move relative to the rotor in a direction 512. The first channels and the second channels are oriented to accommodate the angular component of the leakage flow. Thus, when viewed in a single axial direction (either forward or rearward) the angular component of the first channels is opposite that of the second channels. However, when viewed from the center of the groove, they will be in the same direction and the channels may appear identical.

Additionally, to further induce a circumferential flow within the groove (e.g., between the PSR and the groove base) the first and second channels may be angularly/circumferentially offset from each other out of phase so that flow passes inward through the higher pressure side channels and then passes circumferentially before exiting the lower pressure side channels.

The channels are open channels, open respectively forward or aftward along their length to the groove. As is discussed below, alternate channels are closed channels closed along their lengths but having ports at or near their opposite ends such as drilled or machined holes. Thus, the channels have outboard ends 204A, 204B (FIG. 6A) at the OD surface and inboard ends 206A, 206B at or near the groove base. Although shown as straight, an alternate configuration of open channel (or hole described below) is arcuate/curving when viewed axially along the engine axis/centerline.

FIG. 5 shows each set of channels as having a uniform angular spacing $\theta_P$. For a per side channel count of "n", $\theta_P=360°/n$. FIG. 5 shows a branch of the leakage flow passing between adjacent channels with an inlet leg 514-1, an outlet leg 515-2 and an intermediate leg 514-3. Each leg has a circumferential/tangential component in the direction 512. To facilitate the circumferential flow, the first channels are out of phase with the second channels. In particular, the inboard ends of the first channels are circumferentially offset from the inboard ends of the second channels and vice-versa. This provides the intermediate leg 514-3 with a component in the direction 512. FIG. 6A shows an example angular offset $\theta_{S1}$ between each channel 200A and the next channel 200B in the direction 512. An angular offset $\theta_{S2}$ is shown between each channel 200A and the preceding channel 200B in the direction 512 and is equal to $\theta_P$ minus $\theta_{S1}$. The example offset $\theta_{S1}$ with evenly spaced arrays of the same number "n" of channels is essentially 90° out of phase (that's 90° of array phase relationship, not 90° about the axis) yielding $\theta_{S1}$ of half 360°/n. This provides a circumferential length of travel for the branches of the leakage flow between the PSR ID surface and the groove base for flow from a channel 200A on one side of the PSR to an adjacent channel 200B on the other side of the PSR. This offset may be measured as the angle $\theta_{S1}$ about the inner member centerline or may be measured linearly along the groove base. More broadly, example offset $\theta_{S1}$ is 10% to 80% of 360°/n, more narrowly 15% to 60% or 30% to 60%. A relatively smaller offset (e.g., below 50% closer to the low end of 10%) may be desirable to limit frictional flow losses/windage while still preserving angular momentum of the flow. However a near 90° phase maximizes strength by placing weakened or stressed areas on the two sides of the groove out of phase. In the example, the OD ends of the channels are circumferentially offset and are similarly out of phase.

Alternatively described, a $\theta_{S1}$ of half 360°/n phase relationship may be defined as fully (100%) out of phase; $\theta_{S1}$ of one quarter (or three quarters) 360°/n phase relationship may be defined as half (50%) out of phase.

In a further variation shown in FIGS. 9-13, the first and second channels 400A, 400B are closed channels (e.g., drilled or plunge electro-discharged machined (EDM)) so as to have OD ends/ports 404A, 404B on the OD surface and ID ends/ports 406A, 406B along the respective grooved sidewalls at or near the base. Thus, such closed channels may be drilled with both a tangential component such as that discussed above and an axial component toward the groove from OD to ID. Such drilled holes have an example hole Diameter D (FIG. 9) of 0.75 mm to 6.5 mm, more particularly 1.5 mm to 3.2 mm. EDM with an arcuate electrode may yield the arcuate holes described above.

An example number "n" of channels per side for either embodiment is at least three (e.g., three to forty, more narrowly, four to thirty-two or eight to twenty-four or ten to twenty or twelve to eighteen (e.g., an example sixteen)).

Additionally, although not shown, there may be cocked conditions where the PSR axial end faces are not parallel to the adjacent groove sidewalls. Similarly, whereas the OD surface 30 of the PSR may be in full axial contact with the runner ID surface, other non-contacting or more locally contacting situations may be present.

Component materials and manufacture techniques and assembly techniques may be otherwise conventional. Additionally, in one example, the channels are machined into an otherwise fully formed baseline shaft groove by machining (e.g., via end mill (e.g., ball end mill) for channels or drilling for holes). Other machining examples include abrasive quills, abrasive wheels, and electrodischarge machining (EDM).

Alternatively to sealing a disk bore to a shaft, such venting means may be applied to static structures such as cases.

Alternatively, applications beyond gas turbine engines include pumps, turbochargers, and other turbomachines.

FIG. 8 shows an example gas turbine engine 800 as a two-spool turbofan engine. Although shown as a high bypass turbofan, a low bypass turbofan may have similar features. The engine 800 has an engine case 822 surrounding a centerline or central longitudinal axis 500. An example engine has a fan section 824 including a fan 826 within a fan case 828. The example engine includes an inlet 830 at an upstream end of the fan case receiving an inlet flow along an inlet flowpath 520. The fan 826 has one or more stages 832 of fan blades (typically one in a high bypass turbofan and more in a low bypass turbofan). Downstream of the fan blades, the flowpath 520 splits into an inboard portion 522 being a core flowpath and passing through a core of the engine and an outboard portion 524 being a bypass flowpath exiting an outlet 834 of the fan case.

The core flowpath 522 proceeds downstream to an engine outlet 836 through one or more compressor sections, a combustor, and one or more turbine sections. The example engine has two axial compressor sections and two axial turbine sections, although other configurations are equally applicable. From upstream to downstream there is a low pressure compressor section (LPC) 840, a high pressure compressor section (HPC) 842, a combustor section 844, a high pressure turbine section (HPT) 846, and a low pressure turbine section (LPT) 848. Each of the LPC, HPC, HPT, and LPT comprises one or more stages of blades which may be interspersed with one or more stages of stator vanes. In many low bypass turbofan configurations, the core and bypass flows rejoin to exit a nozzle (e.g., a variable nozzle).

In the example engine, the blade stages of the LPC and LPT are part of a low pressure spool mounted for rotation about the axis 500. The example low pressure spool includes a shaft (low pressure shaft) 850 which couples the blade stages of the LPT to those of the LPC and allows the LPT to drive rotation of the LPC. In the example engine, the shaft 850 also drives the fan. In the example implementation, the fan is driven via a transmission (not shown, e.g., a fan gear drive system such as an epicyclic transmission) to allow the fan to rotate at a lower speed than the low pressure shaft.

The example engine further includes a high pressure shaft 852 (of which the shaft section 198 forms a section) mounted for rotation about the axis 500 and coupling the blade stages of the HPT to those of the HPC to allow the HPT to drive rotation of the HPC. In the combustor 844, fuel is introduced to compressed air from the HPC and combusted to produce a high pressure gas which, in turn, is expanded in the turbine sections to extract energy and drive rotation of the respective turbine sections and their associated compressor sections (to provide the compressed air to the combustor) and fan.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. As noted above, this may include use in various rotor constructions in addition to those with tensioned shafts. Accordingly, other embodiments are within the scope of the following claims.

What is claimed is:

1. A machine comprising a rotor having:
an inner member;
an outer member encircling the inner member;
a groove in one of the inner member and the outer member, the groove having a first side wall, a second side wall and a base; and
a split ring seal accommodated in the groove and contacting a surface of the other of the inner member and the outer member,
wherein:
the first side wall has a plurality of open radial first channels;
the second side wall has a plurality of open radial second channels;
in an outward radial direction the second channels have an angular component opposite an angular component of the first channels; and
viewed axially, the first channels and second channels are off radial by an angle θ of at least 5°.

2. The machine of claim 1 wherein:
the machine is a turbomachine having an upstream end and a downstream end;
the first channels are upstream channels;
the second channels are downstream channels;
the rotor has a direction of rotation; and
in the outward radial direction the second channels have said angular component in the direction of rotation.

3. The machine of claim 1 wherein:
the first channels and the second channels are open channels.

4. The machine of claim 1 wherein:
the first channels and the second channels are at least 30% out of phase with each other.

5. The machine of claim 1 wherein:
the first channels are identical to the second channels.

6. The machine of claim 1 wherein:
there are ten to twenty first channels; and
there are ten to twenty second channels.

7. The machine of claim 1 wherein:
the groove is in the inner member.

8. The machine of claim 7 being a gas turbine engine wherein:
the inner member is a shaft of a spool; and
the outer member is a seal runner protruding from a bore of a disk of a rotor stack of the spool.

9. The machine of claim 1 wherein:
the inner member is made of a nickel-based alloy;
the outer member is made of a nickel-based alloy; and
the split ring seal comprises or consists of a nickel-based alloy or a cobalt-based alloy.

10. A method for using the machine of claim 1, the method comprising:
driving rotation of the inner member and the outer member and creating a pressure difference across the split ring seal; and
the pressure difference causing gas flow through the first channels into the groove and from the groove through the second channels.

11. The method of claim 10 wherein:

the gas flow reduces a circumferential thermal asymmetry induced by a circumferentially asymmetrical seating of at least one of the first axial end face and the second axial end face.

* * * * *